US010208520B2

(12) United States Patent
Long et al.

(10) Patent No.: US 10,208,520 B2
(45) Date of Patent: Feb. 19, 2019

(54) METHOD AND APPARATUS FOR ADJUSTING THE CLOSING FORCE OF A DOOR

(71) Applicant: SCHLAGE LOCK COMPANY LLC, Indianapolis, IN (US)

(72) Inventors: Nicholas Long, Castle Rock, CO (US); Aaron P. McKibben, Fishers, IN (US); Jason Fodstad, Zionsville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 263 days.

(21) Appl. No.: 15/155,167

(22) Filed: May 16, 2016

(65) Prior Publication Data
US 2017/0328108 A1 Nov. 16, 2017

(51) Int. Cl.
E05F 1/10 (2006.01)
G01L 3/24 (2006.01)

(52) U.S. Cl.
CPC .............. *E05F 1/105* (2013.01); *G01L 3/242* (2013.01)

(58) Field of Classification Search
CPC ... E05F 1/10; E05F 1/041; E05F 1/105; E05F 5/027; E05F 15/04; G01L 3/242
See application file for complete search history.

(56) References Cited

U.S. PATENT DOCUMENTS 5,036,620 A * 8/1991 Beran .................. E05D 15/54
49/141

5,274,312 A * 12/1993 Gerstenkorn ........... E05F 1/025
187/316
5,687,507 A 11/1997 Beran
(Continued)

FOREIGN PATENT DOCUMENTS

DE 102007062473 A1 7/2009
DE 102015200284 B3 10/2015

OTHER PUBLICATIONS

International Search Report; International Searching Authority; International Patent Application No. PCT/US2017/032612; dated Aug. 4, 2017; 2 pages.

(Continued)

*Primary Examiner* — Katherine W Mitchell
*Assistant Examiner* — Abe Massad
(74) *Attorney, Agent, or Firm* — Taft Stettinius & Hollister LLP

(57) ABSTRACT

A method of adjusting the closing force of a door coupled to a door closer assembly having a bias element. The method includes determining the kinetic energy of the door without using the weight or other dimensions of the door. The determined kinetic energy is used to adjust the closing force of an electro-mechanical door closer that includes a spring and a motor. The door includes the use of one, some of, or all of an accelerometer, an angular position sensor, a time to close, a breaking torque, and a controller to identify values of acceleration, velocity, and/or position of the door. The identified values are provided to the controller, which is configured to calculate the kinetic energy of the door. The calculated kinetic energy is used to determine the closing velocity of the door closure to ensure proper operation of the door at the point of installation.

20 Claims, 8 Drawing Sheets

(56) References Cited

U.S. PATENT DOCUMENTS

| | | | |
|---|---|---|---|
| 5,770,934 A * | 6/1998 | Theile | H02H 7/0851 |
| | | | 318/466 |
| 6,063,274 A | 5/2000 | Rivera | |
| 7,971,316 B2 | 7/2011 | Copeland, II et al. | |
| 8,169,169 B2 | 5/2012 | Hass et al. | |
| 8,415,902 B2 | 4/2013 | Burris et al. | |
| 8,527,101 B2 | 9/2013 | Burris et al. | |
| 8,547,046 B2 | 10/2013 | Burris et al. | |
| 8,564,235 B2 | 10/2013 | Burris et al. | |
| 8,773,237 B2 | 7/2014 | Burris et al. | |
| 2009/0007489 A1 | 1/2009 | Kern et al. | |
| 2009/0265992 A1* | 10/2009 | Hass | E05F 15/63 |
| | | | 49/340 |
| 2011/0257796 A1 | 10/2011 | Burris et al. | |
| 2012/0180261 A1 | 7/2012 | Zimmer et al. | |
| 2013/0276748 A1 | 10/2013 | Kromer et al. | |
| 2013/0340343 A1 | 12/2013 | Dye et al. | |
| 2014/0325911 A1 | 11/2014 | Hass | |
| 2015/0059249 A1 | 3/2015 | Yulkowski | |
| 2017/0226788 A1* | 8/2017 | Conner | E05F 15/41 |

OTHER PUBLICATIONS

Written Opinion; International Searching Authority; International Patent Application No. PCT/US2017/032612; dated Aug. 4, 2017; 6 pages.

* cited by examiner

METHOD AND APPARATUS FOR ADJUSTING THE CLOSING FORCE OF A DOOR

FIELD OF THE INVENTION

The present disclosure generally relates to a door and a door operator, and more particularly to a door operator configured to close the door in a controlled manner.

BACKGROUND

Door operators are configured to move a door from an open position to a closed position under control of a spring mechanism, a motor, a valve, or other actuators. When closing the door, in particular, the door operator is configured to control the speed at which the door is closed to ensure that the door doesn't close too slowly or too quickly. The door operator typically includes features, such as potentiometer presets, which are set to a predetermined location before or during installation to ensure that the door operates within an effective operating range. Door operators are also known as door closers.

Certain manufacturers of door hardware follow certain agreed to standards which specify that a door's kinetic energy should be maintained within a predetermined operating range. Currently the manufacturers or installers of door closers use a lookup table in order to determine the specified operating region of the door and the door closer, and then manually set the required presets of the door closer parameters. To set the operating characteristics of the door closer, certain door features, which include the weight of the door and other dimensions, must be known. These characteristics of the door, however, are not easily determined at the point of installation or once a door has been installed. Consequently, adjustment of the door closer at the point of installation can be problematic. There is a need, therefore, for ensuring the door closer has been properly calibrated at the point of installation, without knowing the door characteristics prior to installation of the door and the door closer.

SUMMARY

As described herein, a method for adjusting the closing force of a door coupled to a door closer assembly having a bias element includes determining the kinetic energy of the door without using the weight or dimensions of the door, such as height and width. The determined kinetic energy is used to adjust the closing force of an electro-mechanical door actuator that includes a spring and a motor. The door includes the use of one, some of or all of an accelerometer, an angular position sensor, a time to close, a braking torque, and a controller to identify values of acceleration, velocity, and/or position of the door. The identified values are provided to the controller which is configured to calculate the kinetic energy of the door. The calculated kinetic energy is used to determine the closing velocity of the door closure to ensure proper operation of the door at the point of installation.

In one embodiment, there is provided a method for adjusting the closing force of a door coupled to a door closer assembly having a bias element. The method includes: placing the door in a first position; initiating movement of the door from the first position to a second position; measuring movement of the door from the first position to the second position; determining a mass moment of inertia of the door as a function of the measured movement; determining the kinetic energy of the door as function of the mass moment of inertia; and modifying an operating characteristic of the door closer assembly as a function of the determined kinetic energy to adjust the closing force of the door closer assembly.

In another embodiment, there is provided a method for adjusting the closing force of a door coupled to a door closer assembly having a bias element and a controller configured to control movement of the door from an open position to a closed position. The method includes: placing the door in an open position; initiating movement of the door from the open position to the closed position; determining at least one of a plurality of operating characteristics with the controller during movement of the door including: (i) an acceleration of the door, (ii) a torque value; (iii) an angular position of the door; and (iv) a period of time for the door to move from a first position to a second position; and determining a mass moment of inertia of the door using the determined one of the plurality of operating characteristics.

DETAILED DESCRIPTION

Figure 1:
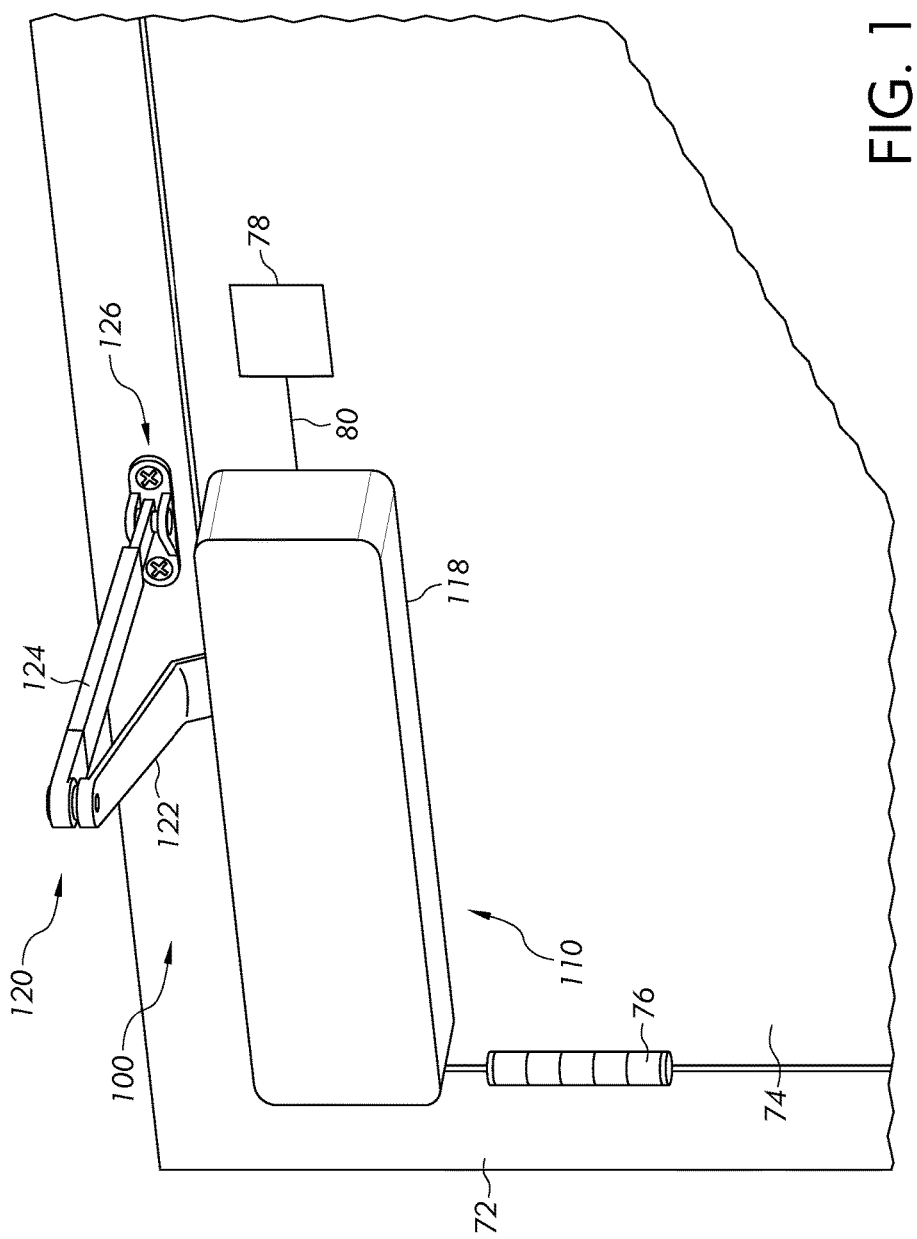
FIG. 1 is a perspective illustration of a door operator coupled to a door and to a door frame.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates a door frame 72 configured to pivotal mount a door 74 with one or more hinges, one of which hinge 76 is shown. A door operator 100 includes an operator body 110 and an arm assembly 120 connected between the body 110 and the frame 72. The body 110 is mounted on the door 74, and the arm assembly 120 is connected between the body 110 and the door frame 72. In other embodiments, the body 110 may be mounted on the frame 72, and the arm assembly 120 may be connected between the body 110 and the door 74. An accelerometer 78 is located on the door 74 and is electrically coupled to the door operator 100. The accelerometer 78, in different embodiments, is located on the door at the point of purchase or is mounted to the door at the point of installation. The accelerometer 78 is connected to the door operator 100 either wirelessly or through a hardwired connection 80. In other embodiments, the accelerometer 78 is located within the door operator 100. In different embodiments, the accelerometer 78 includes one of mechanical and electrical accelerometers. Different types of electrical accelerometers include piezoelectric, Hall-effect and semiconductor.

Figure 2:
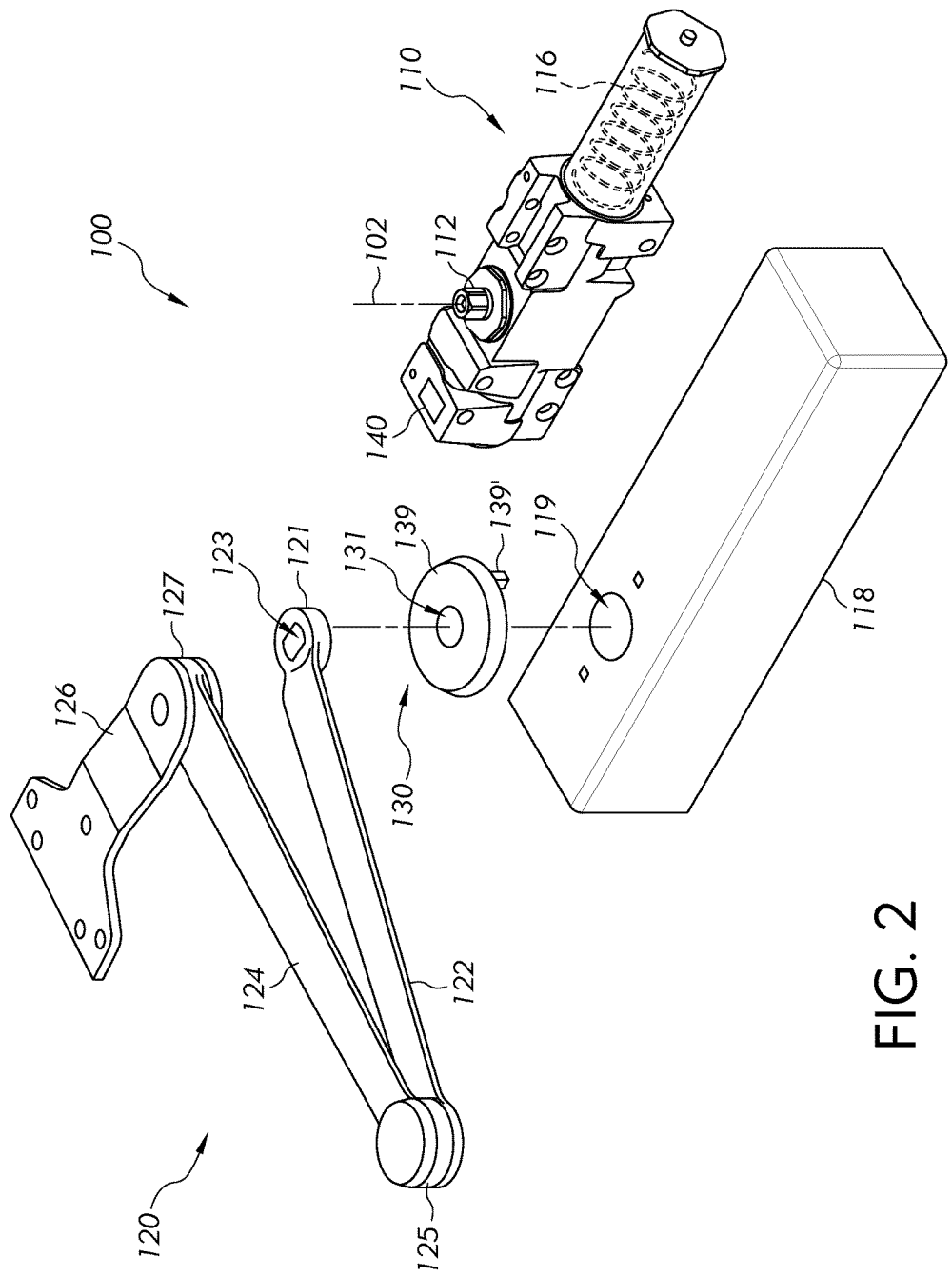
FIG. 2 is a schematic block diagram of selected components of the door operator of FIG. 1.

As illustrated in FIG. 2, the body 110 houses various internal components of the operator 100, including a pinion 112 which is rotatable about a rotational axis 102. The body 110 may also include a case 118 including an opening 119 operable to receive an end of the pinion 112. The body 110 may further include a rack drivingly engaged with the pinion 112, a spring or other bias element 116 engaged with the rack, and an actuation mechanism 150 in communication with the controller 140 (see FIG. 3), both of which are disposed within the case 118.

The arm assembly 120 generally includes a first arm 122, a second arm 124, and a bracket 126. A first end of the first arm 122 includes a hub 121 which is coupled to the pinion 112, and a second end of the first arm 122 is pivotally connected to the second arm 124. For example, the end of the pinion 112 may have a non-circular cross-section, and the hub 121 may have an opening 123 configured to mate with the end of the pinion 112. The second arm 124 is pivotally connected to the first arm 122 by a first pivot joint 125, and is pivotally connected to the bracket 126 by a second pivot joint 127. While the illustrated arm assembly 120 is configured as a scissors-type arm assembly, it is also contemplated that the arm assembly 120 may include a single arm. For example, the second end of the first arm 122 may be slid into a track mounted on the door 74 or the door frame 72.

As seen in FIG. 2, a sensor 130 is mounted on the body 110 and is associated with the arm assembly 120. More specifically, the sensor 130 is positioned between the first arm 122 and the casing 118 such that the first arm 122 overlaps the sensor 130. The illustrated sensor 130 includes an opening 131 sized and configured to receive the hub 121 and/or the end of the pinion 112. The sensor opening 131 is aligned with the case opening 119. The pinion 112 and/or the first arm 122 extend through the openings 119, 131. As described in further detail below, the illustrated inductive sensor 130 is operable to sense a rotational position of the first arm 122. While the sensor 130 in the instant embodiment is associated with the arm assembly 120, it is also contemplated that the sensor 130 may be associated with another element of the operator 100.

Figure 3:
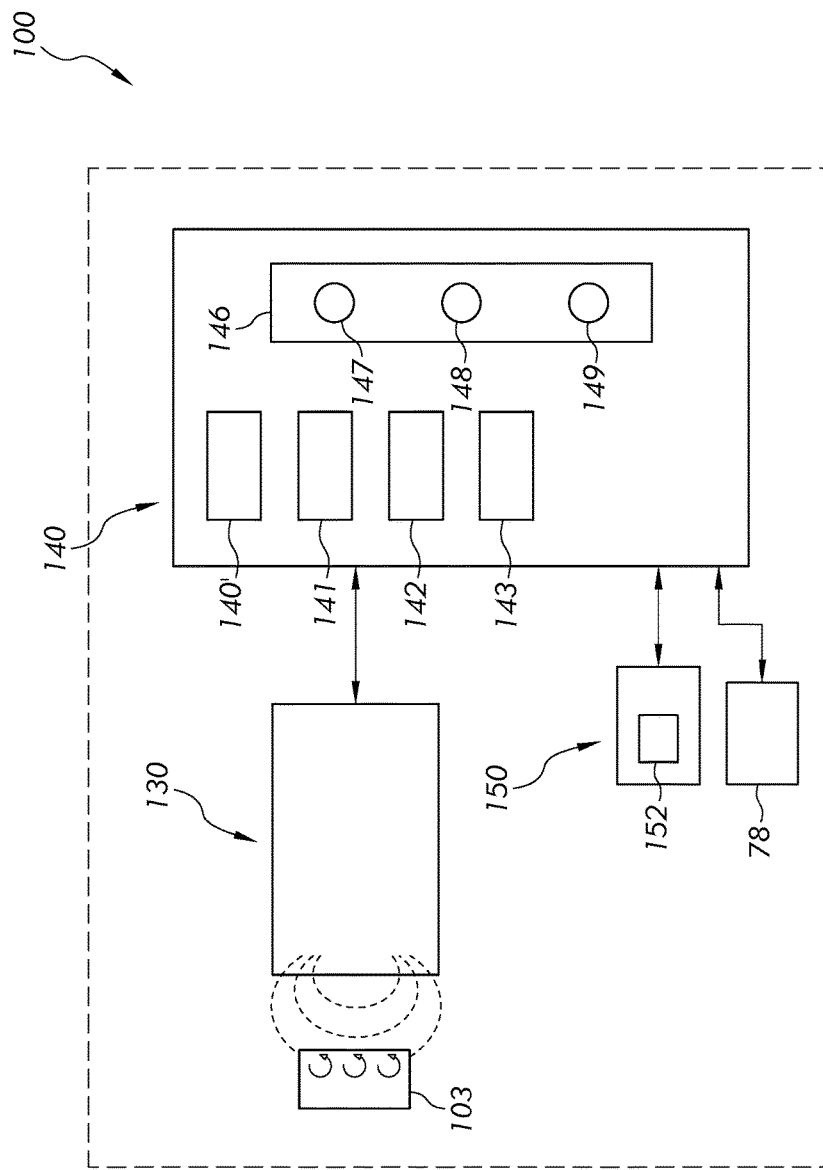
FIG. 3 is a schematic block diagram of selected components of the door operator illustrated in FIG. 1.

As seen in FIG. 3, the sensor 130 is an inductive sensor that interacts with a conductive target 103 that has a position corresponding to the position of the door 74 such as, for example, the arm 122 or another element of the operator 100. As would be appreciated by those having skill in the art, an alternating current flowing through the inductor to generate a magnetic field 133 by which the target 103 can be inductively linked.

Interaction of the sensor 130 with target 103 is a function of the distance, size and composition of the target 103. Thus, changes in the distance, position and/or orientation of the target 103 with respect to inductive coil sensor will cause a variation in the sensed position of the target 103 with respect to the sensor 130. The sensor 130 is configured to generate an output signal corresponding to one or more of the variable characteristics affected by interaction between the sensor 130 and the target 103. In other embodiments, the sensor 130 is a mechanical sensor and the target 103 engages the sensor 130 at a mechanical interface between the sensor and the target. In one embodiment, the sensor 130 provides a signal to the controller 140 which determines from the signal an angular position of the door 74 with respect to the frame 72.

The controller 140 is in communication with the sensor 130, and may further be in communication with an actuation mechanism 150. As illustrated, the controller 140 includes a processor 140', a sensor unit 141, an accelerometer unit 142, a determining unit 143, and a memory 146. As described in further detail below, the sensor unit 141 is configured to activate the sensor 130 and to receive data from the sensor 130. The accelerometer unit 142 is configured to receive data from the accelerometer 78. The determining unit 143 is configured to determine an angular position of the door using information received from the sensor 130 or an acceleration value of the door using information received from the accelerometer 78.

The memory 146 is a non-transitory computer readable medium having data stored thereon, and is in communication with the processor 140'. The data stored on the memory 146 may include, for example, one or more sets of instructions 147, one or more look-up tables 148 and/or additional data 149. The instructions 147 may be executed by the processor 140' to cause the processor 140' to perform one or more functions such as, for example, the functions associated with one or more of the described units. While the illustrated controller 140 is housed within the body 110, it is also contemplated that the controller 140 may be positioned elsewhere on the operator 100 or externally to the operator 100.

The processor 140', in different embodiments, is a programmable type, a dedicated, hardwired state machine, or a combination of these, and can further include multiple processors, Arithmetic-Logic Units (ALUs), Central Processing Units (CPUs), Digital Signal Processors (DSPs) or the like. Other forms of processor 140' include multiple processing units, distributed, pipelined, and/or parallel processing. The processor 140' may be dedicated to performance of the operations described herein or may be utilized in one or more additional applications. In the depicted form, the processor 140' is of a programmable variety that executes algorithms and processes data in accordance with defined by programmed instructions (such as software or firmware) stored in memory 146. Alternatively or additionally, the operating logic for processor 140' is at least partially defined by hardwired logic or other hardware. The processor 140', in different embodiments, is comprised of one or more components of any type suitable to process the signals received from input/output devices, and provide desired output signals. Such components may include digital circuitry, analog circuitry, or a combination of both.

The memory 146 includes one or more types, such as a solid-state variety, electromagnetic variety, optical variety, or a combination of these forms. Furthermore, the memory 146 includes, in different embodiments, volatile, nonvolatile, or a combination of these types, and a portable variety, such as a disk, tape, memory stick, cartridge, or the like. In addition, the memory 146 is configured to store data that is manipulated by the operating logic of the processor 140', such as data representative of signals received from and/or sent to the door operator in addition to or in lieu of stored program instructions, just to name one example.

The actuation mechanism 150 is configured to regulate the rotational speed of the pinion 112, thereby regulating the angular speed of the door 74 during opening and/or closing events. The actuation mechanism 150 may alternatively be referred to as a pinion control mechanism or a speed regulating mechanism. The actuation mechanism 150 may include an actuator 152 configured to perform actions in response to commands from the controller 140. The actuator 152 may, for example, be an electromechanical actuator such as a motor, solenoid or electromechanical valve.

In certain embodiments, the actuator 152 may be a motor. For example, in one embodiment, the operator 100 is provided as a door actuator, and the motor may rotate the pinion 112 to actively urge the door 74 in the opening direction during opening events. In other embodiments, the actuation mechanism 150 may include a valve in a hydraulic damper assembly. For example, the operator 100 may be configured as a door closer which regulates the angular speed of the door 74, but does not actively urge the door 74 to the open position.

In different embodiments, the operator 100 includes a plurality of door operation devices which are adjustable to alter the operating characteristics of the operator 100, which adjusts the operation characteristics of the door in opening and closing cycles. The door operation devices include door opening and closing cycle devices, including an opening speed device, a back check speed device, a hold open time device, a delay device, a closing speed device, a latch position device, and a back check position device.

As the door 74 moves, the position, distance and/or orientation of the target 103 changes with respect to the sensor 130, thereby causing the sensor 130 to generate an output signal indicative of one or more of the variable characteristics of the sensor 130. For example, the converter 136 may generate a digital output signal having a value corresponding to an angle of the door 74 with respect to the frame 72.

Figure 4:
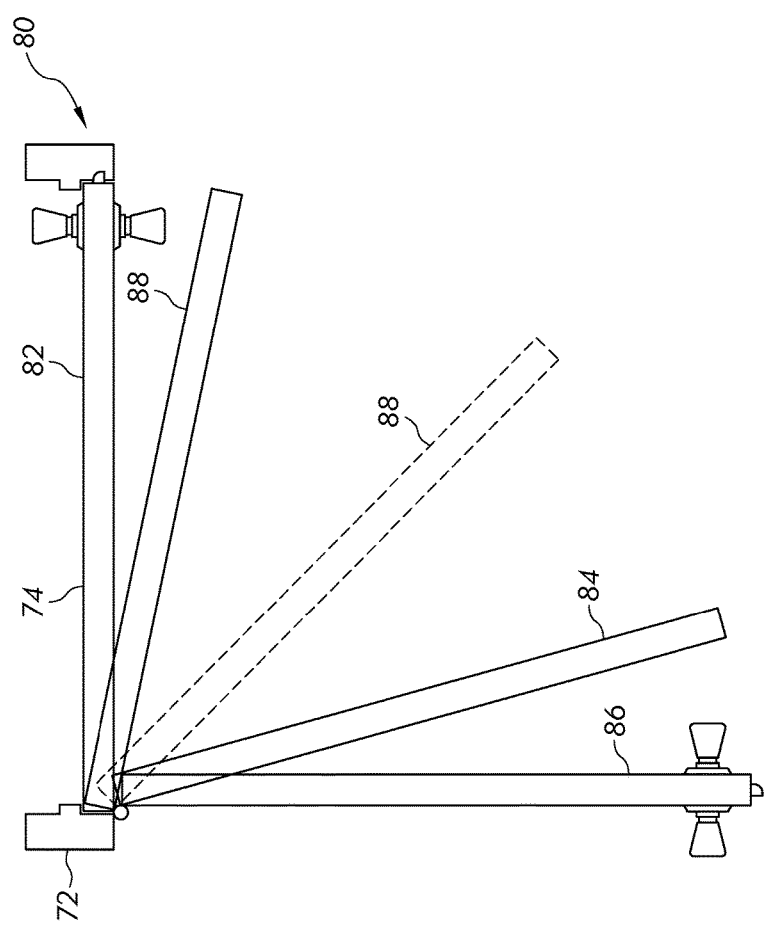
FIG. 4 is a diagram of various positions of a door.

FIG. 4 illustrates the door 74 during an illustrative opening and closing process with respect to the frame 72. The door 74 has a range of positions 80 including a closed position 82, intermediate positions 84 and 88, and an open position 86. As will be appreciated, the arm 122 has a plurality of arm positions each of which correspond to one of the door positions 80. Generally speaking, the door 74 moves from the closed position 82 toward the open position 86 during an opening motion, and moves from the open position 86 toward the closed position 82 during a closing motion. A full open/close motion includes moving the door 74 from the closed position 82 to the open position 86, and subsequently returning the door 74 to the closed position 82.

In order to determine a preferred operating range of the door, particularly, in a door closing operation, one embodiment includes determining a kinetic energy of the door using the accelerometer 78. The accelerometer 78 determines the angular acceleration of the door. When used in combination with a torque value, which is determined by the controller 140, and a time to close, the mass moment of inertia (MMI) of the door is determined by dividing the torque value by the angular acceleration. The determined value of the MMI is used by the controller 140 to calculate the kinetic energy when multiplied by one-half (½) and the square of the integral of a determined angular acceleration, including a determination of angular velocity.

The controller 140 is configured to determine kinetic energy of the door using known mathematical equations. For instance, the kinetic energy, in one embodiment, is determined with the following equation:

$$KE = \frac{1}{2}I\omega^2$$

Where:
KE=Kinetic Energy
I=Mass Moment of Inertia
ω=Angular Velocity

The torque value is determined with the following equation:

$$\tau = Ia$$

Where:
τ=torque
α=Angular Acceleration

In the embodiments described herein additional equations are used by the controller 140 to determine angular position (θ) and angular velocity (ω) as follows:

$$\theta = \omega_0 t + \frac{1}{2}\alpha t^2$$

Where:
θ=Angular Position
t=

$$\omega(t) = \frac{d\theta}{dt}$$

$$\alpha(t) = \frac{d^2\theta}{dt^2}$$

$$\theta(t) = \int \omega(t)\,dt$$

$$\omega(t) = \int \alpha(t)\,dt$$

$$\tau = f(sf, gd)$$

Where:
f(sf,dg)=a function of spring force and door geometry

Figure 5:
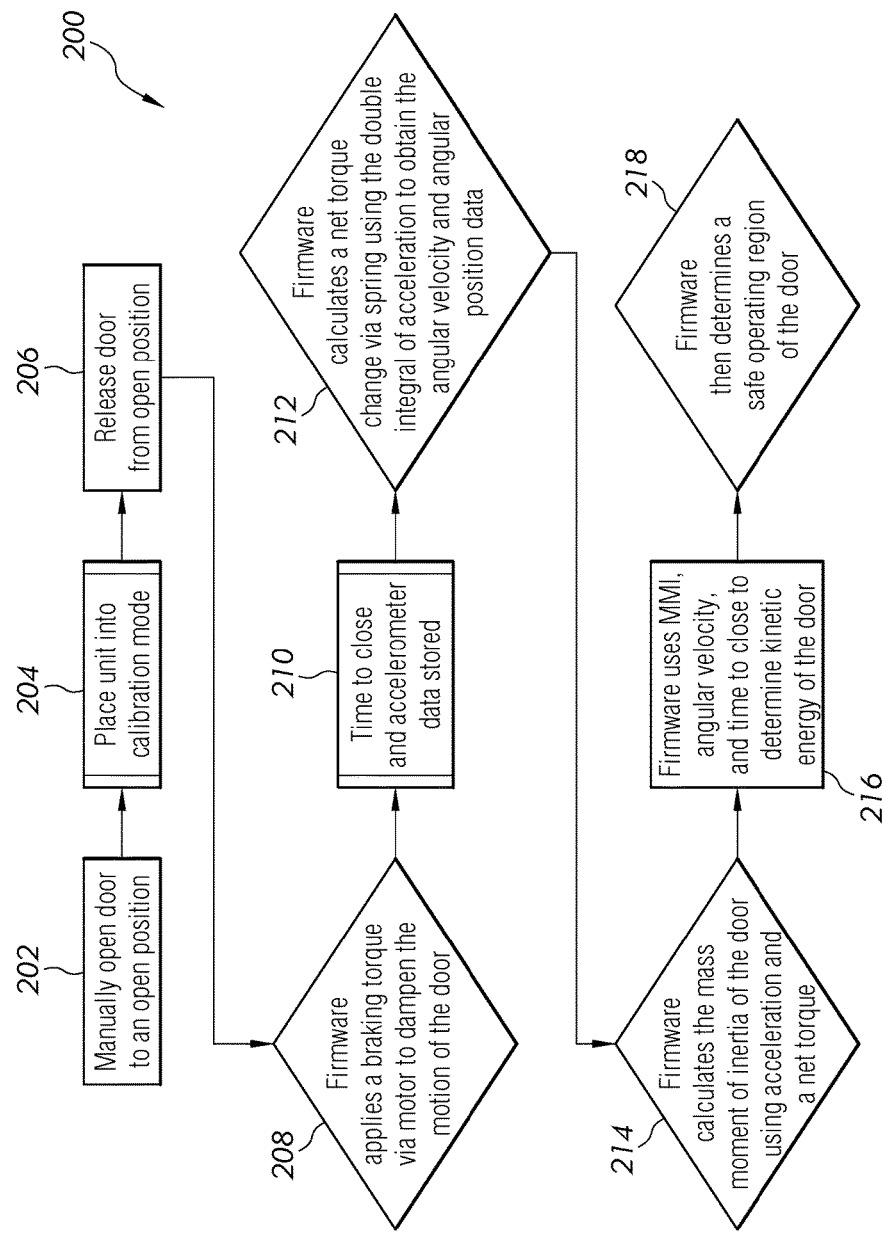
FIG. 5 is a block diagram of a process to calibrate a door operator using an accelerometer.

FIG. 5 illustrates one embodiment of a process 200 using the accelerometer 78 to set a preferred operation range of the door. The process includes manually opening the door, once installed, to an open position, such as 90 degrees, with respect to the door frame at block 202. Once the door is placed in the open position, the door operator 100 is placed in a calibration mode at block 204, which is determined by software instructions located in the memory 146 and which is performed by the controller 140 throughout the calibration mode. The open position of the door, in different embodiments, is determined by an angle sensor determining that the door is at the open position or is set by an installer though a switch or other signal transmitted to the controller 140. Once the calibration mode has been set, the door is released or moved from the open position at block 206. The controller 140, upon release of the door, determines a time at which the door is released, by initiating a timer for instance. The controller 140 then applies a braking torque, or braking force, using the actuation mechanism 150, such as a motor, to dampen the closing motion of the door at block 208. In one embodiment, the applied braking torque is zero. The braking torque is determined by the controller 140 using acceleration data provided by the accelerometer 78. Stored software instructions resident in firmware, in one embodiment, are used by the controller to apply the braking torque. As the door closes, the controller 140 determines acceleration versus time, which is stored by the controller in memory 146.

Once the door has reached the door closed position, which can be determined in one embodiment, by engagement of the door latch with the door frame, the controller 140 determines the total amount of time taken for the door to move from the open position to the closed position at block 210. Once closed, the time to close value and the accelerometer data are stored in memory 146. Upon storage of the data, the controller determines a net torque change using spring data, which includes a known default starting torque/spring force set at the factory and stored in the memory. The determined spring displacement versus the angular position of the door is determined by the controller 140 by calculating a double integral of the stored angular acceleration at block 212. As is known by those skilled in the art, by twice integrating acceleration, an angular position is determined. Consequently, in this embodiment, an angular position sensor is not required, as the accelerometer data provides the desired position information.

Using this information, the controller 140 determines a mass moment of inertia of the door using the stored value of acceleration over time and the net torque at block 214. After block 214, the controller 140 using the determined MMI, the determined angular velocity, and time to close to calculate the kinetic energy at block 216. At block 218, the controller then determines a preferred operating region of the door which is defined according to the door setup/installation requirements. The determined preferred operating region is used by the controller 140 to control closing of the door.

In one embodiment, the controller 140 uses the determined preferred operating region to control the actuation mechanism during closing movements of the door. In other embodiments, the controller provides control device settings to the installer, who in turn manually sets the control devices to the provided settings. In another embodiment, some of the control device settings are manually set by the operator and the controller electrically controls closing of the door through the actuation mechanism 150. Once the MMI is calculated, a maximum kinetic energy for safe door operation is determined. The kinetic energy of the door can then be limited via the angular velocity of the door by motor braking, automatic hydraulic valve adjustment, or manual adjustments.

Figure 6:
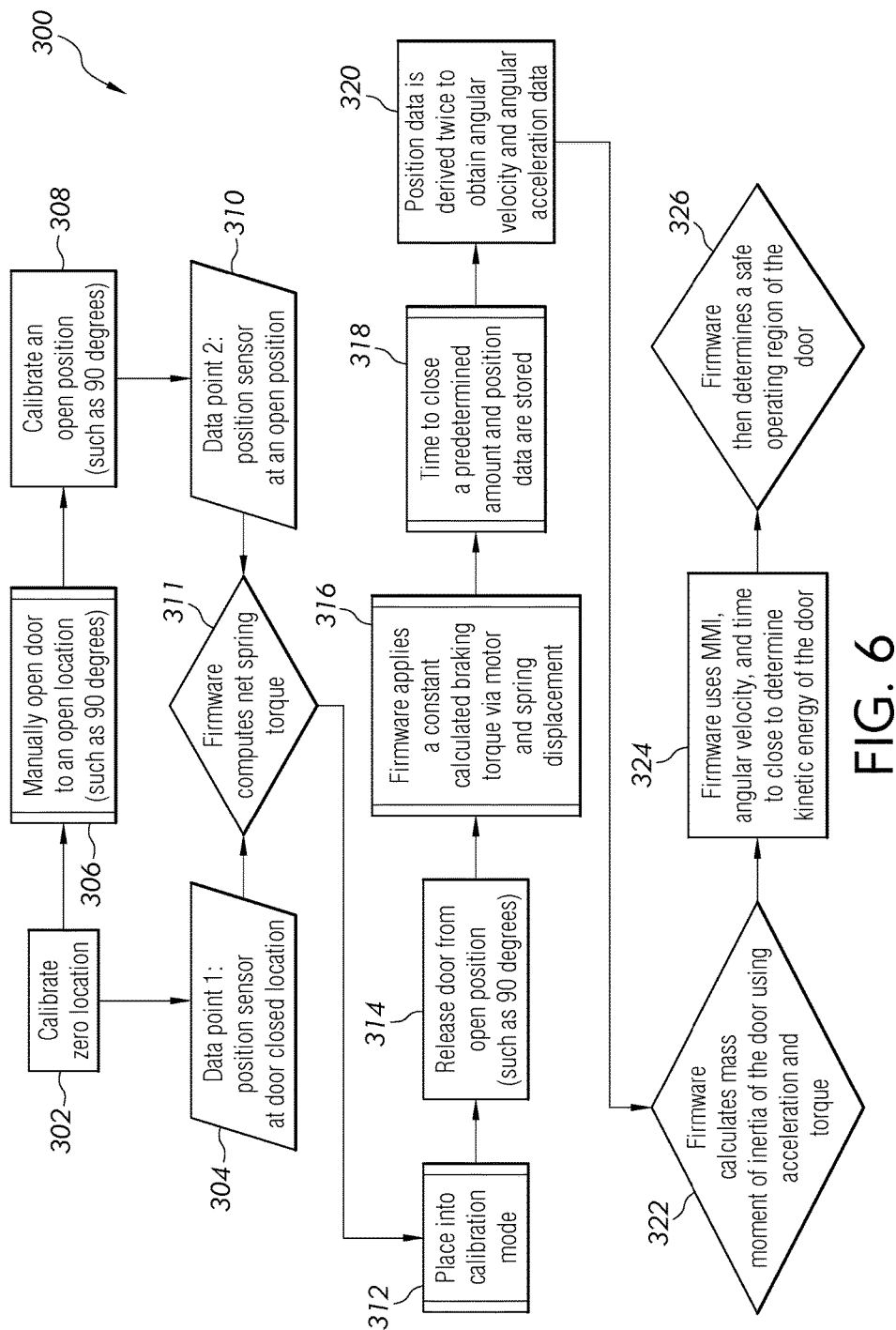
FIG. 6 is a block diagram of a process to calibrate a door operator using an angular position sensor.

FIG. 6 illustrates another embodiment of a process 300 using the angular position sensor 130 and the application of a constant braking torque as determined by the controller 140 to set a preferred operation range of the door. The angular position sensor, in different embodiments includes, but is not limited to, a potentiometer and an encoder. The position values, provided by the position sensor, are used in conjunction with a torque value (which is measured by the controller 140) and with a time to close value to determine the MMI of the door. The MMI of the door is determined by dividing the average torque value by the second derivative of angular position (angular acceleration)

As seen in FIG. 6, a zero location data point is determined by the controller at a door closed position at block 302. The zero location data point is the value of the bias element force determined as a function of a known default starting torque/spring force which is set by the manufacturer and stored in memory. Once the zero data point has been calculated, a first data point, corresponding to the angular position of the door with respect to the frame at the closed location, is stored in memory at block 304. The door is then manually opened at block 306 to an open position, such as 90 degrees. Once at the open position, the controller calibrates the open position at block 308 by measuring the rotation of the pinion 112, which in turn is used to determine spring force. A second data point is determined and stored in memory by the controller 140 at block 310. Once the first and second data points have been determined, the controller 140 computes a net spring torque of the bias element using the first and second data points as end points at block 311.

After the net spring torque is computed and stored in memory, the door closer 100 is placed in a calibration mode by the installer at block 312. This calibration mode is activated by either a mechanical or electrical actuation of a switch, the actuation of which is recognized by the controller 140. The door is then released from the open position at block 314. As the door moves from the open position to the closed position, the controller 140 applies a constant calculated braking torque using the actuation mechanism 150 and displacement information at block 316. The applied constant braking torque dampens the closing of the door. At the same time, a time to close from the open position to the closing position is determined by the controller 140. The determined time to close, the predetermined amount, and the position data are stored at block 318. The stored position data is used to determine an angular velocity, by a first derivative, and is used to determine an angular acceleration, by a second derivative of the position data at block 320.

Once these values have been determined, the controller 140 determines the MMI of the door using determined angular acceleration and determined torque at block 322. The controller then determines at block 324 the kinetic energy of the door by using the determined MMI, the angular velocity, and the time to close. At block 326, the controller determines a preferred operating region of the door which is defined according to the door setup/installation requirements. Once the operating region of the door is determined, the door closer 100 is configured to meet the defined operating regions.

Figure 7:
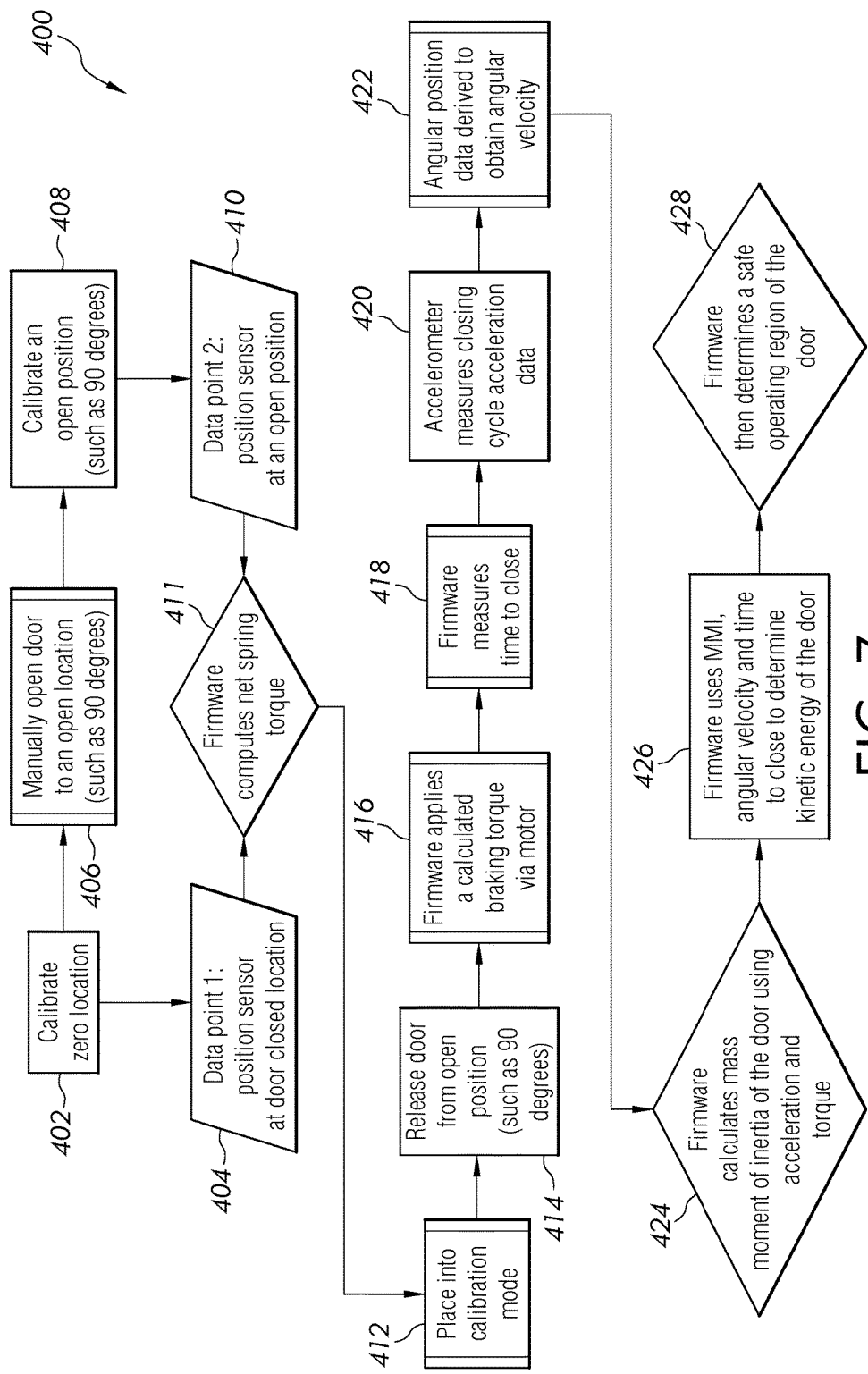
FIG. 7 is a block diagram of a process to calibrate a door operator using both an accelerometer and an angular position sensor.

In an embodiment 400 of FIG. 7, an accelerometer and an angular position sensor are both utilized to calibrate the door closer 100. In this embodiment, the use of both the angular position sensor and the accelerometer reduces software and/or firmware calculations. The accelerometer is used to determine the angular acceleration of the door. When used in conjunction with a torque value (measured by the controller) and two known angular positions using the angular position sensor, the MMI is determinable by dividing the measured torque value by the angular acceleration. The kinetic energy is then determined using the derivative of the angular position sensor data to determine angular velocity, which is squared and which is then multiplied by ½ the calculated MMI.

As seen in FIG. 7, a zero location data point is determined by the controller at a door closed position at block 402. The zero data point is the value of the bias element force which is determined as a function of a known default starting torque/spring force which is set by the manufacturer and stored in memory. Once the zero data point has been calculated, a first data point, corresponding to the angular position of the door with respect to the frame at the closed location, is stored in memory at block 404. The door is then manually opened at block 406 to an open position, such as 90 degrees. Once at the open position, the controller calibrates the open position at block 408. A second data point is determined and stored in memory by the controller 140 at block 410. Once the first and second data points have been determined, the controller 140 computes a net spring torque of the bias element using the first and second data points as end points at block 411. At block 412, the door is placed in the calibration mode by the installer.

The door is then released from the open position at block 414. As the door moves from the open position to the closed position, the controller applies a constant calculated braking torque using the actuation mechanism 150 and displacement information as seen at block 416. The applied constant braking torque dampens the closing of the door. The controller 140 determines the time to close from the open position to the closed position at block 418. Using data provided by the accelerometer 78, the controller accelerometer stores the closing cycle acceleration data at block 420. Angular position data is derived with respect to time to obtain angular velocity data at block 422. The controller 140 then determines at block 424 the MMI of the door using acceleration data and the calculated braking torque determined at block 416.

The controller 140, at block 426, determines the kinetic energy of the door by using the determined MMI, the angular velocity, and the time to close. At block 428, the controller then determines a preferred operating region of the door which is defined according to the door setup/installation requirements. Once the operating region of the door is determined, the door closer 100 is configured to meet the defined operating regions.

Figure 8:
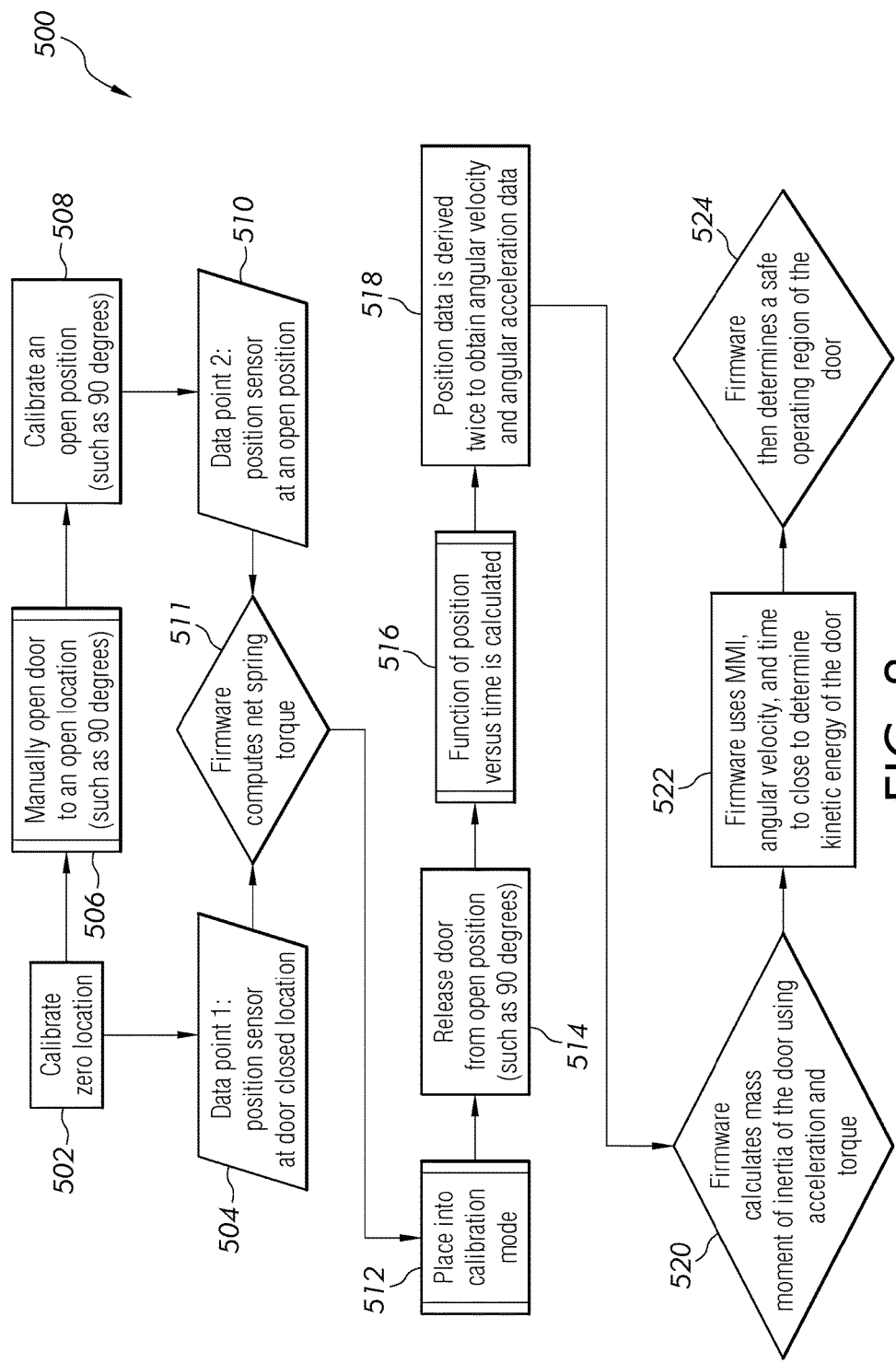
FIG. 8 is a block diagram of a process to calibrate a door operator using an angular position sensor in combination with a determined time function.

FIG. 8 illustrates another embodiment of a process 500 using an angular position sensor to determine an angle of a door versus a time function of the door to move from an open position to a closed position. The angular position sensor, when used in conjunction with a torque value and a time to close, is used to determine the MMI of the door. The MMI is determined by dividing the average torque by the second derivative of angular position (angular acceleration).

As seen in FIG. 8, a zero location data point is determined by the controller at a door closed position at block 502. The zero data point is the value of the bias element force which is determined as a function of a known default starting torque/spring force which is set by the manufacturer and stored in memory. Once the zero data point has been calculated, a first data point, corresponding to the angular position of the door with respect to the frame at the closed location, is stored in memory at block 504. The door is then manually opened at block 506 to an open position, such as 90 degrees. Once at the open position, the controller calibrates the open position at block 508. A second data point is determined and stored in memory by the controller 140 at block 510. Once the first and second data points have been determined, the controller 140 computes a net spring torque of the bias element using the first and second data points as end points at block 511.

After the net spring torque is computed and saved in memory, the door closer 100 is placed in a calibration mode by the installer at block 512. This calibration mode is activated by either a mechanical or electrical actuation of a switch, the actuation of which is recognized by the controller 140. The door is then released from the open position at block 514. As the door moves from the open position to the closed position, the controller 140 determines and stores the position of the door versus time at block 516. The determination provides a velocity of the door moving from the open position to the closed position.

The stored position data is used to determine an angular velocity, by a first derivative of the position data, and is used to determine an angular acceleration, by a second derivative of the position data, at block 518.

Once these values have been determined, the controller 140 determines the MMI of the door using determined angular acceleration and determined torque at block 520. The controller then determines at block 522 the kinetic energy of the door by using the determined MMI, the angular velocity, and the time to close. At block 524, the controller determines a preferred operating region of the door, which is defined according to the door setup/installation requirements. Once the operating region of the door is determined, the door closer 100 is configured to meet the defined operating regions.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for adjusting the closing force of a door coupled to a door closer assembly having a spring, comprising:
    placing the door in a first position;
    initiating movement of the door from the first position to a second position;
    measuring movement of the door from the first position to the second position;
    determining a net torque change between a starting torque and an end torque, wherein the starting torque is a torque exerted on the door when the door is in the first position, and wherein the end torque is a torque exerted on the door when the door is in the second position;
    determining, based upon the measured movement of the door and the net torque change, a mass moment of inertia of the door;
    determining the kinetic energy of the door as a function of the mass moment of inertia; and
    modifying a closing rate of the door closer assembly as a function of the determined kinetic energy to adjust the closing force of the door closer assembly.

2. The method of claim 1, wherein the measuring movement includes measuring movement by determining, with an accelerometer, an acceleration of the door during movement of the door from the first position to the second position; and
    determining the mass moment of inertia as a function of the determined acceleration and the determined net torque change.

3. The method of claim 1, further comprising applying, with a motor, a braking torque to the door during movement of the door from the first position to the second position;
    wherein determining the mass moment of inertia is further based upon the braking torque.

4. The method of claim 3, wherein the braking force is a constant braking force.

5. The method of claim 3, wherein the braking force is a variable braking force.

6. The method of claim 1, wherein the measuring movement of the door from the first position to the second position includes measuring at least one of:

(i) an angular acceleration of the door,
(ii) an angular position of the door; or
(iii) a time for the door to move from the first position to the second position.

7. The method of claim 6, wherein the first position is an open position and the second position is a closed position.

8. The method of claim 1, wherein measuring movement of the door comprises measuring, with an accelerometer, angular acceleration of the door versus time; and wherein the method further comprises determining, based upon the angular acceleration of the door versus time, angular position of the door versus time.

9. The method of claim 8, further comprising determining, based upon the angular position of the door versus time, the starting torque.

10. A method for adjusting the closing force of a door coupled to a door closer assembly, the door closer assembly including a spring and a controller configured to regulate movement of the door from an open position to a closed position, the method comprising:
placing the door in a first angular position;
initiating movement of the door from the first angular position to a second angular position;
monitoring movement of the door as the door moves from the first angular position to the second angular position;
determining, based upon the first angular position, a first torque exerted by the spring on the door, wherein the first torque is exerted when the door is in the first angular position;
determining, based upon the second angular position, a second torque exerted by the spring on the door, wherein the second torque is exerted when the door is in the second angular position;
determining, based upon the first torque and the second torque, a net torque change;
determining, based upon the movement of the door and the net torque change, a mass moment of inertia of the door;
determining, based upon the movement of the door and the mass moment of inertia of the door, a kinetic energy of the door; and
adjusting, by the controller, a closing rate of the door, wherein the adjusting is based upon the kinetic energy of the door.

11. The method of claim 10, further comprising:
applying a braking torque to the door with the door closer as the door moves from the first angular position to the second angular position; and
measuring the period of time for the door to move from the first position to the second position;
wherein monitoring movement of the door comprises monitoring, with an accelerometer, angular acceleration of the door versus time.

12. The method of claim 11, wherein each of the first torque value and the second torque value is determined based in part upon a predetermined starting spring force of the spring and a double integral of the angular acceleration.

13. The method of claim 12 wherein the determining the mass moment of inertia includes determining the mass moment of inertia as a function of the determined net torque change and the determined angular acceleration.

14. The method of claim 11 further comprising determining the angular position of the door with an angular position sensor.

15. The method of claim 14 wherein the determining the mass moment of inertia includes determining the mass moment of inertia as a function of the determined angular position, the determined period of time, a determined angular acceleration of the door, and the determined torque value.

16. The method of claim 15, further comprising:
determining a torque value as a function of applying a braking torque to the door with the door closer,
determining the period of time for the door to move from the first angular position to the second angular position, and
determining the angular position of the door with an angular position sensor.

17. The method of claim 16 wherein the determining the mass moment of inertia includes determining the mass moment of inertia as a function of the determined angular position, the determined period of time, and the determined torque value.

18. The method of claim 10, wherein monitoring movement of the door comprises monitoring, by an accelerometer, angular acceleration of the door.

19. The method of claim 10, further comprising placing the door in a calibrating angular position in which the spring exerts a predetermined calibrating torque on the door; wherein the determining the first torque is further based upon the predetermined calibrating torque.

20. The method of claim 19, further comprising determining a spring displacement between the calibrating angular position and the first angular position; wherein the determining the first torque is based upon the predetermined calibrating torque and the spring displacement.

* * * * *